(12) United States Patent
Karpy

(10) Patent No.: US 7,997,405 B2
(45) Date of Patent: Aug. 16, 2011

(54) SANITARY CONVEYOR

(75) Inventor: Daniel Karpy, Lutz, FL (US)

(73) Assignee: Arrowhead Systems, Inc., Oshkosh, WI (US)

( * ) Notice: Subject to any disclaimer, the term of this patent is extended or adjusted under 35 U.S.C. 154(b) by 0 days.

(21) Appl. No.: 12/507,587

(22) Filed: Jul. 22, 2009

(65) Prior Publication Data

US 2011/0017573 A1   Jan. 27, 2011

(51) Int. Cl.
B65G 21/08   (2006.01)
(52) U.S. Cl. .................................. 198/860.1; 198/861.1
(58) Field of Classification Search ............... 198/836.1, 198/836.3, 860.1, 861.1
See application file for complete search history.

(56) References Cited

U.S. PATENT DOCUMENTS

| | | | |
|---|---|---|---|
| 819,908 | A | 5/1906 | Miller |
| 1,817,373 | A | 8/1931 | Hopkins |
| 3,292,772 | A | 12/1966 | Rice |
| 3,355,008 | A | 11/1967 | Milazzo |
| 3,508,642 | A | 4/1970 | Standley et al. |
| 3,584,731 | A | 6/1971 | Dahlem et al. |
| 3,596,752 | A | 8/1971 | Garvey |
| 3,796,503 | A | 3/1974 | Dawson |
| 3,800,938 | A | 4/1974 | Stone |
| 3,874,497 | A | 4/1975 | Carlson |
| 3,934,707 | A | 1/1976 | Bowman |
| 3,999,648 | A | 12/1976 | Kennedy |
| 4,003,465 | A | 1/1977 | Bauer |
| 4,039,073 | A | 8/1977 | Ohlhaver |
| 4,146,126 | A | 3/1979 | Mattos |
| 4,147,248 | A | 4/1979 | Kurczak et al. |
| 4,333,297 | A | 6/1982 | Kuttenbaum et al. |
| 4,369,873 | A | 1/1983 | Heuft |
| 4,511,030 | A | 4/1985 | Lem |
| 4,511,031 | A | 4/1985 | Lachonius |
| 4,550,820 | A | 11/1985 | Bishop |
| 4,562,921 | A | 1/1986 | Leemkuil et al. |
| 4,598,815 | A | 7/1986 | Adama |
| 4,616,745 | A | 10/1986 | Hartness |
| 4,723,649 | A | 2/1988 | Hartness et al. |
| 4,771,876 | A | 9/1988 | Bandixen |
| 4,830,173 | A | 5/1989 | Hartness et al. |
| 4,874,079 | A | 10/1989 | Frenkel et al. |
| 4,926,599 | A | 5/1990 | Scholz |
| 4,934,516 | A | 6/1990 | Dugan |

(Continued)

FOREIGN PATENT DOCUMENTS

EP   409379   1/1991

(Continued)

OTHER PUBLICATIONS

AMBEC Product Information for Cobra Laning System as shown on www.ambec.com dated Apr. 11, 2006.

(Continued)

Primary Examiner — James R Bidwell
(74) Attorney, Agent, or Firm — Boyle Fredrickson, S.C.

(57) ABSTRACT

A conveyor includes a frame and a bracket assembly attached to the frame, the bracket assembly including a series of mounting brackets having a slot for receiving a member. The slot releasably secures the member to the bracket. The member may be a side rail, a table or a support rail. The conveyor may include a belt, an actuator for driving the belt, and rollers for guiding the belt.

23 Claims, 5 Drawing Sheets

U.S. PATENT DOCUMENTS

| | | | |
|---|---|---|---|
| 5,042,636 A | 8/1991 | Underwood | |
| 5,082,108 A | 1/1992 | Douglas | |
| 5,098,248 A | 3/1992 | McFall | |
| 5,101,959 A | 4/1992 | Whitby | |
| 5,137,145 A | 8/1992 | Clopton | |
| 5,174,430 A | 12/1992 | Ebira | |
| 5,178,263 A | 1/1993 | Kempen | |
| 5,186,314 A | 2/1993 | Clopton | |
| 5,282,525 A | 2/1994 | Covert | |
| 5,310,047 A | 5/1994 | Ledingham | |
| 5,314,059 A | 5/1994 | Clopton | |
| 5,421,451 A | 6/1995 | Easton | |
| 5,423,409 A | 6/1995 | Wipf | |
| 5,441,142 A | 8/1995 | Schneider | |
| 5,518,102 A | 5/1996 | Hershline | |
| 5,562,202 A | 10/1996 | Newcomb et al. | |
| 5,601,180 A | 2/1997 | Steeber et al. | |
| 5,638,938 A | 6/1997 | Lazzarotti et al. | |
| 5,716,189 A | 2/1998 | Winski et al. | |
| 5,746,572 A | 5/1998 | Winski | |
| 5,762,794 A | 6/1998 | Simkowski et al. | |
| 5,787,679 A | 8/1998 | Lynch et al. | |
| 5,788,052 A | 8/1998 | Spatafora | |
| 5,819,907 A | 10/1998 | Simkowski | |
| 5,842,818 A | 12/1998 | Simkowski | |
| 5,944,165 A | 8/1999 | Mannlein et al. | |
| 5,961,275 A | 10/1999 | Winski et al. | |
| 5,971,137 A | 10/1999 | Grant et al. | |
| 5,988,356 A | 11/1999 | Bonnet | |
| 6,044,956 A | 4/2000 | Henson et al. | |
| 6,058,601 A | 5/2000 | DeKoning | |
| 6,062,376 A | 5/2000 | Nerenhausen, Sr. | |
| 6,068,105 A | 5/2000 | Darwish et al. | |
| 6,139,240 A | 10/2000 | Ando | |
| 6,170,645 B1 * | 1/2001 | Mitchell | 198/860.1 |
| 6,170,649 B1 | 1/2001 | Radandt et al. | |
| 6,189,702 B1 | 2/2001 | Bonnet | |
| 6,220,420 B1 | 4/2001 | Jan et al. | |
| 6,253,905 B1 | 7/2001 | Pelka | |
| 6,257,805 B1 | 7/2001 | Bernard | |
| 6,264,042 B1 | 7/2001 | Cossey, Jr. et al. | |
| 6,295,781 B1 | 10/2001 | Thompson | |
| 6,296,111 B1 | 10/2001 | Mekanik et al. | |
| 6,334,525 B1 | 1/2002 | Collins et al. | |
| 6,398,461 B1 | 6/2002 | Vincent et al. | |
| 6,401,904 B1 | 6/2002 | Risley | |
| 6,427,831 B1 * | 8/2002 | Norton | 198/861.1 |
| 6,474,463 B1 | 11/2002 | Wolfel | |
| 6,513,642 B1 | 2/2003 | Shearer, Jr. et al. | |
| 6,516,933 B1 | 2/2003 | Ledingham | |
| 6,591,979 B1 | 7/2003 | Karpy | |
| 6,612,426 B1 | 9/2003 | Guerra et al. | |
| 6,691,858 B2 | 2/2004 | Weber | |
| 6,705,452 B2 | 3/2004 | Geve et al. | |
| 6,772,872 B2 | 8/2004 | Spangenberg et al. | |
| 6,848,563 B2 | 2/2005 | Abert et al. | |
| 6,854,586 B1 | 2/2005 | VanderMeer et al. | |
| 6,871,737 B2 | 3/2005 | Ertel et al. | |
| 6,910,568 B1 | 6/2005 | Ydoate et al. | |
| 6,923,308 B2 | 8/2005 | Veit | |
| 7,086,519 B2 | 8/2006 | Veit et al. | |
| 7,086,521 B1 | 8/2006 | Pearce et al. | |
| 7,114,615 B1 * | 10/2006 | Karpy | 198/860.1 |
| 7,114,904 B2 | 10/2006 | Charbonneau et al. | |
| 7,335,096 B2 | 2/2008 | Perez et al. | |
| 7,681,719 B2 * | 3/2010 | Hosch et al. | 198/861.1 |
| 2004/0251176 A1 | 12/2004 | Alonso et al. | |
| 2005/0081460 A1 | 4/2005 | Davis | |
| 2006/0040607 A1 | 2/2006 | Perez et al. | |

FOREIGN PATENT DOCUMENTS

| | | |
|---|---|---|
| EP | 562544 | 9/1993 |
| EP | 0634346 | 1/1995 |

OTHER PUBLICATIONS

Hartness International Information for Hartness Syncro Laner Model 2260 as shown on www.hartness.com dated Apr. 11, 2006.
Nercon Engineering & Manufacturing, Inc.; Modular Conveyor Components; not dated, 17 numbered pages, USA.

* cited by examiner

SANITARY CONVEYOR

BACKGROUND OF THE INVENTION

The present invention relates generally to conveyors and more particularly, to a sanitary conveyor that may be easily assembled and disassembled.

There is a need for a conveyor that may be easily assembled and disassembled without the need for tools or additional fasteners for certain components and that is customizable with respect to its intended use and location. There is a further need for a sanitary conveyor that has parts that are capable of being interchangeably used with other like sanitary conveyors.

BRIEF DESCRIPTION OF THE INVENTION

It is an object of the present invention to provide a sanitary conveyor that is relatively easy to assemble and disassemble. It is another object of the present invention to provide a conveyor that does not require the substantial use of tools for assembly or disassembly. It is a further object of the present invention to provide a conveyor that does not require fasteners to secure certain components, e.g., side rails, support rails and tables, to mounting brackets or other support structure. Specifically, certain components may be releasably secured to mounting brackets by slots in the brackets, e.g., by the geometry of the slots.

Therefore, in accordance with one aspect of the invention, a conveyor includes a frame and a mounting bracket attached to the frame. The mounting bracket has a slot for receiving a member, wherein the slot releasably secures the member to the bracket. The member may be a side rail, a table or a support rail. The conveyor may further include a plurality of mounting brackets spaced along the length of the frame. Further, the conveyor may include a belt, an actuator for driving the belt, and rollers for guiding the belt.

In accordance with another aspect of the invention, a conveyor includes a frame and a plurality of brackets attached to the frame. The brackets are spaced apart from one another along the length of the frame. The conveyor further includes a plurality of support rails removably attached to the plurality of brackets, a side rail removably attached to the plurality of brackets, and a table removably attached to an adjacent two of the plurality of brackets. The support rails, the side rail and the table are attachable to and removable from the brackets without the need for tools.

In accordance with a still further aspect of the invention, a conveyor includes a frame supporting a conveyor belt, a bracket attached to the frame, and a slot in the bracket for receiving a member. The slot has a protrusion and the member has an aperture corresponding with the slot, wherein the slot, the protrusion and the aperture cooperate to releasably secure the member to the bracket.

In accordance with a further aspect of the invention, a method for attaching a member to a conveyor having a mounting bracket with a slot includes the steps of positioning the member at substantially the same angle as an angled portion of a first edge of the slot, sliding the member along the angled portion of the first edge of the slot, pivoting the member about a corner on the first edge, aligning a hole in the member with a protrusion on a second edge of the slot, and inserting the protrusion into the hole. The member may be in the form of a side rail or a table.

Other aspects, features, and advantages of the invention will become apparent to those skilled in the art from the following detailed description and accompanying drawings.

It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout.

In the drawings.

DETAILED DESCRIPTION

Figure 1:
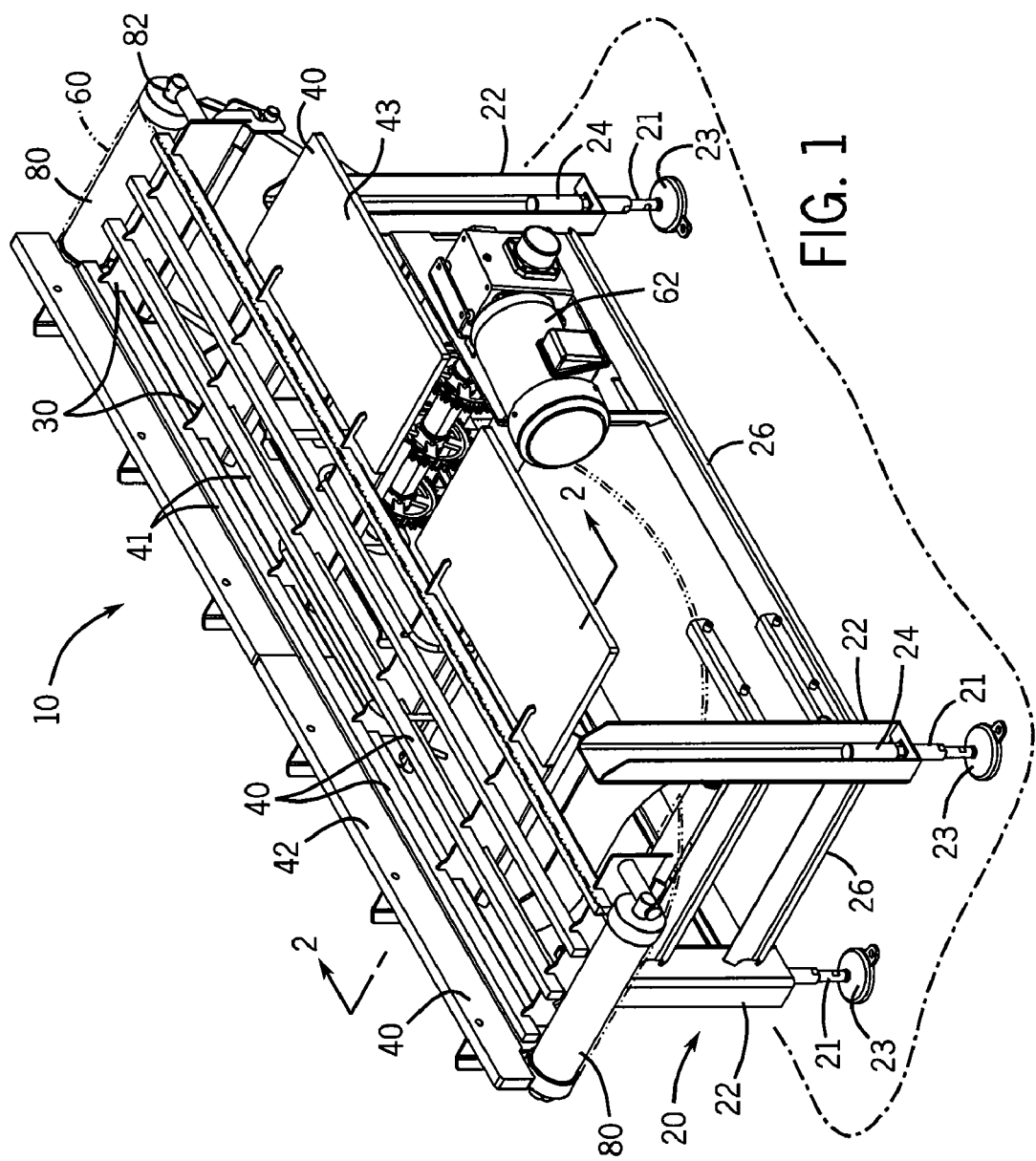
FIG. 1 is a front isometric view of a sanitary conveyor in accordance with the present invention.

FIG. 1 illustrates one embodiment of a sanitary conveyor 10 of the present invention. Generally, the sanitary conveyor 10 comprises a frame 20, a plurality of mounting brackets 30 and a series of guide and/or support members 40 releasably attached to the mounting brackets 30.

The frame 20 preferably includes a series of legs 22 that extend substantially vertically to support the sanitary conveyor 10. Though the number and positioning of the legs 22 may vary, in the preferred embodiment there are four legs 22 positioned near the corners of a generally rectangular footprint formed by the sanitary conveyor 10. See FIG. 4.

Each leg 22 may have a foot 23 upon which the frame rests, and each foot 23 may be vertically adjustable. For example, the foot 23 may have a threaded shaft 21 that engages a corresponding opening in the leg 22. By rotating the foot 23 or the shaft 21 in a desired direction, the height of that particular leg 22, and thus the height of the sanitary conveyor 10, may be adjusted. The feet 23 may be adjusted to account for discrepancies in the levelness of the floor, e.g., when placed on an uneven floor, the feet 23 may be adjusted accordingly so that the top of the sanitary conveyor 10 is level.

In the illustrated embodiment shown in FIGS. 1-5, each leg 22 has a U-shaped channel that receives the shaft 21 that supports the foot 23. This configuration allows a user to easily rotate the shaft 21 to adjust the height rather than the foot 23, which is more difficult to access than the shaft 21. The shafts 21 may be fitted with thread covers 24.

The frame 20 may further include frame support horizontal members 26 to provide further stability to the frame 20. In the preferred embodiment, the frame support horizontal members 26 are positioned substantially horizontally and are connected to the legs 22, as shown in FIG. 1.

The frame 20 may be a unitary welded structure, or it may be comprised of separate components, as discussed above and shown in FIG. 1, for example, that are secured together using any suitable means, e.g., screws, bolts, rivets, etc. The frame may be made of any suitable material, and may be made from stainless steel for use in a sanitary or washdown environment.

Figure 2:
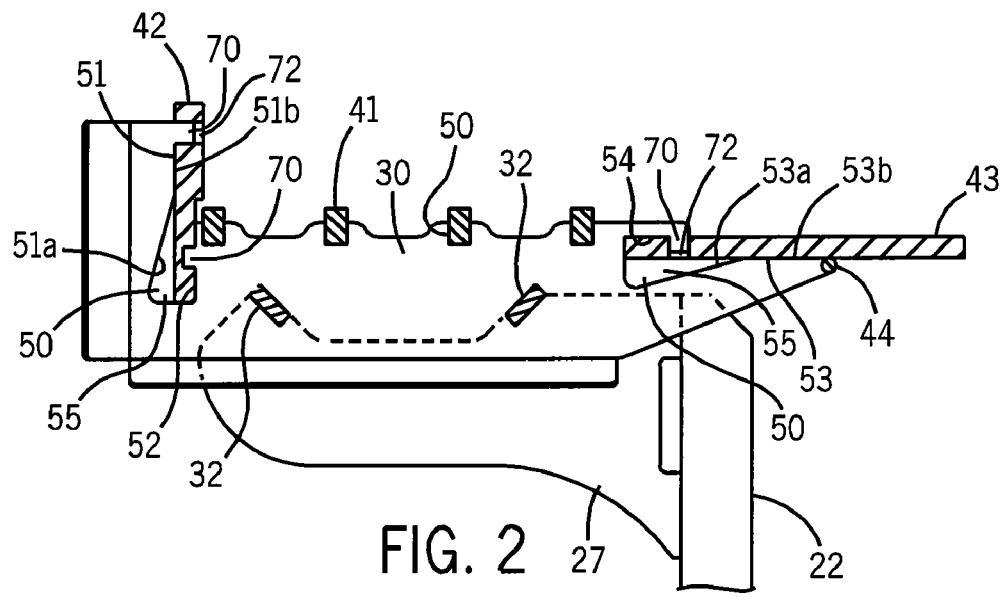
FIG. 2 is a cross-sectional view taken along line 2-2 as shown in FIG. 1.

As discussed above, the illustrated embodiment of the sanitary conveyor 10 comprises a plurality of brackets 30 positioned near the top of the frame 20, as shown in FIGS. 1 and 2. In the illustrated embodiment there are six brackets 30, but the number of brackets 30 may vary as desired.

Each bracket 30 is preferably relatively thin and plate-like. In the illustrated embodiment, the brackets 30 are positioned substantially parallel to one another and are spaced apart along the length of the sanitary conveyor 10.

Figure 2A:
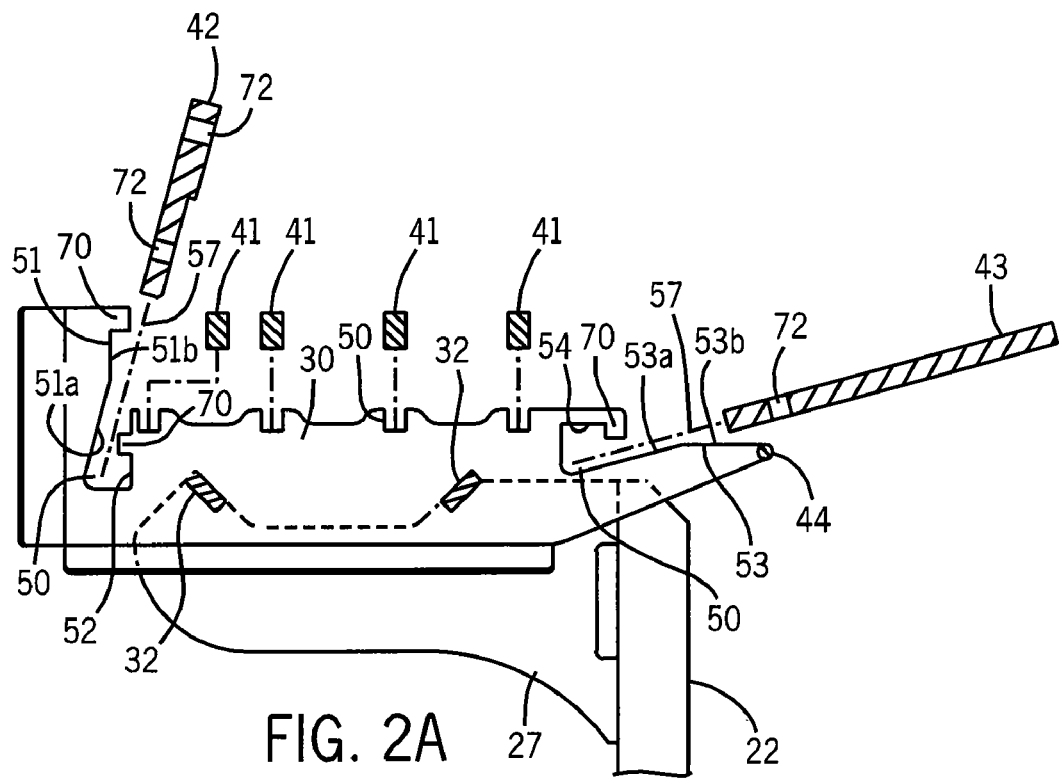
FIG. 2A is a cross-sectional view taken along line 2-2 as shown in FIG. 1 showing various members before being inserted into respective slots.
Figure 3:
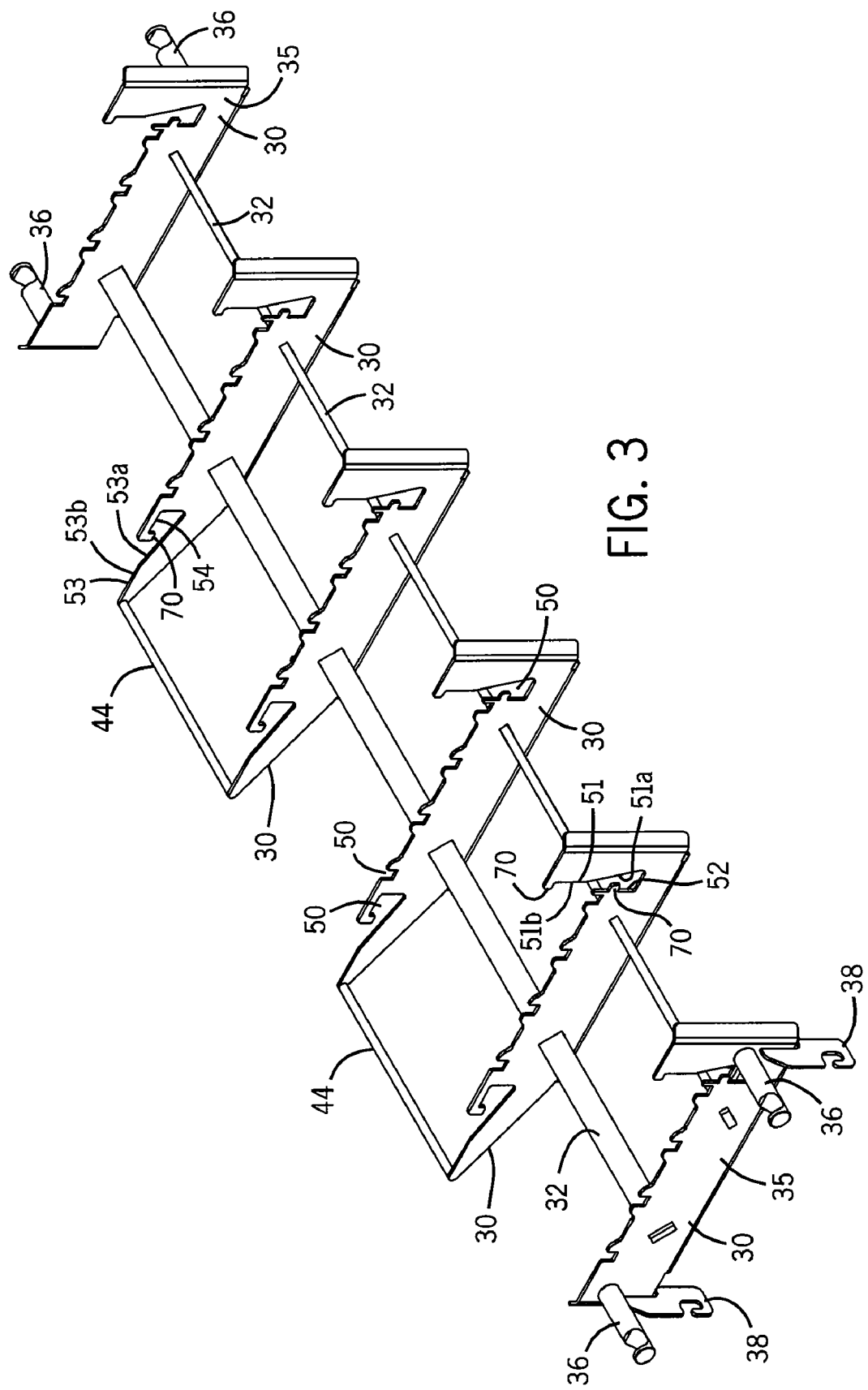
FIG. 3 an isometric view of the bracket assembly of the sanitary conveyor of FIG. 1.

The brackets 30 are secured in the illustrated spaced arrangement with bracket supports 32. As shown in FIG. 3, the bracket supports 32 are in the form of bars or rods that are positioned substantially perpendicular to the brackets 30. The bracket supports 32 extend along substantially the entire length of the sanitary conveyor 10. Each bracket 30 has an aperture for receiving the bracket support 32. In the illustrated embodiment, each bracket support 32 is positioned at an angle of about 45° with respect to a horizontal plane, although it is understood that the bracket supports may be positioned at any other angle. In the illustrated embodiment, the bracket supports 32 interface with the frame 20 to support the bracket assembly atop the frame 20. For example, as shown in FIGS. 2 and 2A, the parallel bracket supports 32 are each supported by a corresponding angled edge of support component 27 of the frame 20. Thus, the bracket supports 32 may be naturally aligned with respect to multiple support components 27 under the force of gravity. As shown in FIGS. 2 and 2A, the support component 27 has a concave channel that has notches on either side for receiving the bracket supports 32.

Each bracket support 32 preferably has a non-circular cross-section, e.g., a rectangular cross section, which prevents the brackets 30 from becoming misaligned by rotating along the longitudinal axis of the bracket support 32. The cross-section of the bracket support 32 is preferably rectangular, although it is understood that any other satisfactory non-circular cross-sectional shape may be employed. Again, the bracket supports 32 may be made of stainless steel for use in a sanitary or washdown environment.

The bracket supports 32 may be any size or shape so long as they secure the brackets 30 in a desired arrangement and support the bracket assembly on the frame 20. Furthermore, the bracket supports 32 need not be unitary members that extend through apertures in the brackets 30. For example, the bracket supports 32 could comprise separate, shorter members that are each attached to respective brackets 30, e.g., by welding. The brackets 30 and bracket supports 32 are preferably secured together, e.g. by welding, to form a bracket substantially as shown in FIG. 3.

In the illustrated embodiment, each bracket 30 has a plurality of slots 50, with each slot 50 being configured to receive a type of member 40, e.g., a side rail, a support rail or a table. As shown in FIG. 3, in the preferred embodiment, the shape of the slot 50 is specific to the type of member 40 received by the slot 50. However, the slots 50 and the corresponding members 40 may be configured so that the slots are substantially the same shape and size and capable of receiving multiple types of members.

A first type of member 40 received by and secured to the bracket 30 is a support rail 41. In the illustrated embodiment, the brackets 30 receive a plurality of support rails 41. The support rails 41 are positioned beneath a conveyor belt 60 and provide support for the belt 60 and items that are supported on the belt. As shown in FIG. 1, for example, the illustrated embodiment features four support rails 41. However, the number of support rails 41 may vary as desired, e.g., depending on the size, shape, and weight of the items to be transported on the conveyor belt 60.

The size and shape of the support rails 41 may vary, but preferably the support rails 41 are in the form of bars or rods having a substantially rectangular cross-section. Thus, the support rails 41 provide a flat surface beneath the conveyor belt 60 to support and guide the belt 60 and items on the belt 60. Each support rail 41 may be a single member along the length of the sanitary conveyor 10 (or along the length of a series of sanitary conveyors 10 arranged end to end), or the support rail 41 may be comprised of separate sections (not shown) secured together to form the support rail 41.

In the illustrated embodiment, the brackets 30 have rectangular slots 50 to receive the support rails 41. The support rails 41 are preferably secured within the slots 50 via push-on engagement, which allows for relatively easy and quick assembly and disassembly. However, any suitable means of releasably securing the support rails 41 to the brackets 30 may be used. As shown in FIG. 2, when the support rails 41 are inserted into respective slots 50, a top surface of each support rail 41 extends above the bracket 30. This configuration prevents the bracket 30 from interfering with the movement of the conveyor belt 60 while at the same time providing a smooth surface, i.e., the top surfaces of the support rails 41, along which the conveyor belt 60 can slide.

Another type of member 40 received by the brackets 30 is a side rail 42. As shown in FIG. 1, in the illustrated embodiment the side rail 42 is positioned along one side of the conveyor 10. The side rail 42 extends above the conveyor belt 60 and helps to prevent items from falling off of the conveyor belt 60.

The side rail 42 is received in a slot 50 that is located near an end of each bracket 30. As shown in FIG. 3, the bracket 30 is preferably L-shaped in order to provide support for the side rail 42. For example, when the side rail 42 experiences a substantially horizontal force, e.g., when a user pushes an item onto the conveyor belt 60 in a direction transverse to the motion of belt 60, the vertical portion of the bracket 30 provides additional support to the side rail 42.

Preferably, the slot 50 for receiving the side rail 42 has a first edge 51 that has an angled portion 51*a* and a substantially vertical portion 51*b*. Thus, the angled portion 51*a* of the first edge 51 causes the slot 50 to narrow from the bottom to the top. Near the top of the slot 50, the first edge 51 becomes substantially vertical and extends above the bracket. The first edge 51 preferably has a protrusion 70 near the top of the first edge 51 that engages a corresponding hole 72 in the side rail 42. The slot 50 also has a second edge 52 opposite the first edge 51. Preferably, the second edge 52 is substantially vertical. The second edge 52 also preferably has a protrusion 70 that engages a corresponding hole 72 in the side rail 42. It should be noted that use of the term "vertical" is not intended to be limiting. Instead, it is used as a descriptor to identify a particular feature of the invention as it appears in the drawings, e.g., in FIGS. 2 and 2A.

As shown in FIG. 2, there is a gap 55 between the angled portion 51*a* and the side rail 42 when the side rail 42 is inserted into the slot 50. The gap 55 allows for the side rail 42 to be rotated so that it may be extracted from the slot 50 as desired. The gap 55 similarly provides space for the side rail 42 to be inserted into place and to engage the protrusions 70. During the insertion and removal of the side rail 42, the corner formed by the angled portion 51*a* and the vertical portion 51*b* of the first edge 51 acts as a pivot point that facilitates rotation of the side rail 42 into and out of the slot 50. As shown in FIG. 2, the protrusions 70 preferably are inserted on opposite sides of the side rail 42 to secure the side rail 42 within the slot 50, i.e., one protrusion 70 is inserted into a first surface of the side rail 42 and a second protrusion 70 is inserted into a second surface 70 of the side rail 42.

As the side rail 42 is inserted into the slot 50, a first surface of the side rail 42 is substantially flush with the angled portion 51a of the slot 50 as the side rail 42 is inserted along insertion path 57. As shown in FIG. 2A, insertion path 57 is substantially parallel with angled portion 51a. It should be noted that insertion path 57 also serves as a removal path when the side rail 42 is removed from the slot 50.

Thus, the preferred slot configuration shown in FIGS. 2 and 2A allows for relatively easy and quick assembly and disassembly of the side rails 42 with the brackets 30. Attachment of the side rails 42 to one or more of the plurality of brackets 30 involves the following steps.

First, the user positions the side rail 42 at substantially the same angle as the angled portion 51a of the first edge 51 of the slot 50. The user then slides the rear side of the side rail 42 along the angled portion 51a of the first edge 51 of the slot 50 until the bottom of the side rail 42 contacts the bottom of the slot 50. Next, the user pivots the side rail 42 about the corner on the first edge 51 that is formed where the angled portion 51a meets the vertical portion 51b of the first edge 51. When pivoting the side rail 42 into position, the user aligns the apertures, or holes 72, in the side rail with the respective protrusions 70 of the first and second edges. When the user has positioned the side rail 42 substantially vertically, the protrusions 70 engage the respective holes 72 in the side rail 42 to hold the side rail 42 in place with respect to the brackets 30.

The side rail 42 preferably extends along substantially the entire length of the sanitary conveyor 10, and may even extend beyond the ends of the sanitary conveyor 10 if desired. Thus, if multiple sanitary conveyors 10 are aligned in series, the respective side rails 42 will form a continuous side rail to help keep items on the respective belts 60 as the items pass from one sanitary conveyor 10 to another.

Another type of member 40 that may be received by the brackets 30 is a table 43. As shown, the table 43 is a rectangular plate although it is understood that the table 43 may have any other shape or configuration as desired. As shown in FIGS. 1-2A, in the illustrated embodiment the table 43 is secured to the bracket 30 at the end of the bracket 30 opposite the side rail 42. Thus, in use, a user may perform a desired task on an item at the table 43 and then place the item on the conveyor belt 60 after completing the task.

As shown in FIG. 1, in the illustrated embodiment the table 43 is supported by two brackets 30. Between the brackets 30 is a table support 44, which is preferably in the form of a rod. The table support 44 may be integral with the brackets 30 or it may be a separate structure attached to the brackets 30 using any suitable means. The table support 44 is preferably positioned near an outer edge of the table 43, e.g., the edge nearest the user, to provide support for the outer area of the table 43.

In the illustrated embodiment, the slot 50 in the bracket for receiving the table 43 preferably has a first edge 53 having an angled portion 53a and a substantially horizontal portion 53b. The slot 50 also has a second edge 54 opposite the first edge 53, and the second edge 54 is substantially horizontal. The second edge 54 has a protrusion 70 for engaging a corresponding hole 72 in the table 43. As shown in FIG. 2, when the table 43 is in the inserted position, there is a gap 55 between the bottom surface of the table and the angled portion 53a of the first edge 53 of the slot 50. The gap 55 allows for the table 43 to be rotated so that it may be extracted from the slot 50 as desired. The gap 55 similarly provides space for the table 43 to be inserted into place and to engage the protrusion 70.

During the insertion and removal of the table 43, the corner formed by the angled portion 53a and the horizontal portion 53b of the first edge 53 acts as a pivot point that facilitates rotation of the table 43 into and out of the slot 50.

As the table 43 is inserted into the slot 50, the bottom surface of the table 43 is substantially flush with the angled portion 53a of the slot 50 as the table 43 is inserted along insertion path 57. As shown in FIG. 2A, insertion path 57 is substantially parallel with angled portion 53a. It should be noted that insertion path 57 also serves as a removal path when the table 43 is removed from the slot 50.

Attachment of the table 43 to a bracket 30 involves the following steps. First, the user positions the table 43 at substantially the same angle as the angled portion 53a of the first edge 53 of the slot 50. The user then slides the bottom side of the table 43 along the angled portion 53a of the first edge 53 of the slot 50 until the edge of the table 43 contacts the end of the slot 50. Next, the user pivots the table 43 about the corner on the first edge 53 that is formed at the intersection of the angled portion 53a and the horizontal portion 53b of the first edge 53. When pivoting the table 43 into position, the user aligns the hole 72 in the table 43 with the respective protrusion 70 on the second edge 54 of the slot. When the user has positioned the table 43 substantially horizontally, the protrusion 70 engages the respective hole 72 in the table 43 to hold the table 43 in place with respect to the bracket 30.

The geometry and dimensions of the slots 50 for receiving various members 40 is not limited to that discussed above and shown in the figures. Any slot design may be used that allows for the members to be easily attached to and removed from the brackets substantially without the need for tools. Thus, the user may simply slide and/or snap the members 40 into place on the brackets 30 in order to assemble the sanitary conveyor 10.

The various members 40 are formed of any satisfactory material, and particularly may be formed of a plastic material, such as a UHMW plastic material, that is suitable for use in a washdown environment. It is understood, however, that any satisfactory material may be employed for the members 40.

The sanitary conveyor 10 may further include a drive system including an actuator 62 for moving the conveyor belt 60. The actuator 62 is preferably attached to the frame 20 beneath the brackets 30. In the illustrated embodiment shown in FIG. 5, the actuator 62 is attached to an actuator support plate 61, which is in turn secured to the frame 20.

The actuator 62 may be any suitable means for moving the belt 60, e.g., an electrically operated motor. The actuator 62 may be coupled with gears, a gear reducer, and/or a shaft in order to move the belt 60 at a desired speed. The actuator 62 may be controlled using an electronic control system, which may control on/off functions and conveyor belt speed.

Figure 4:
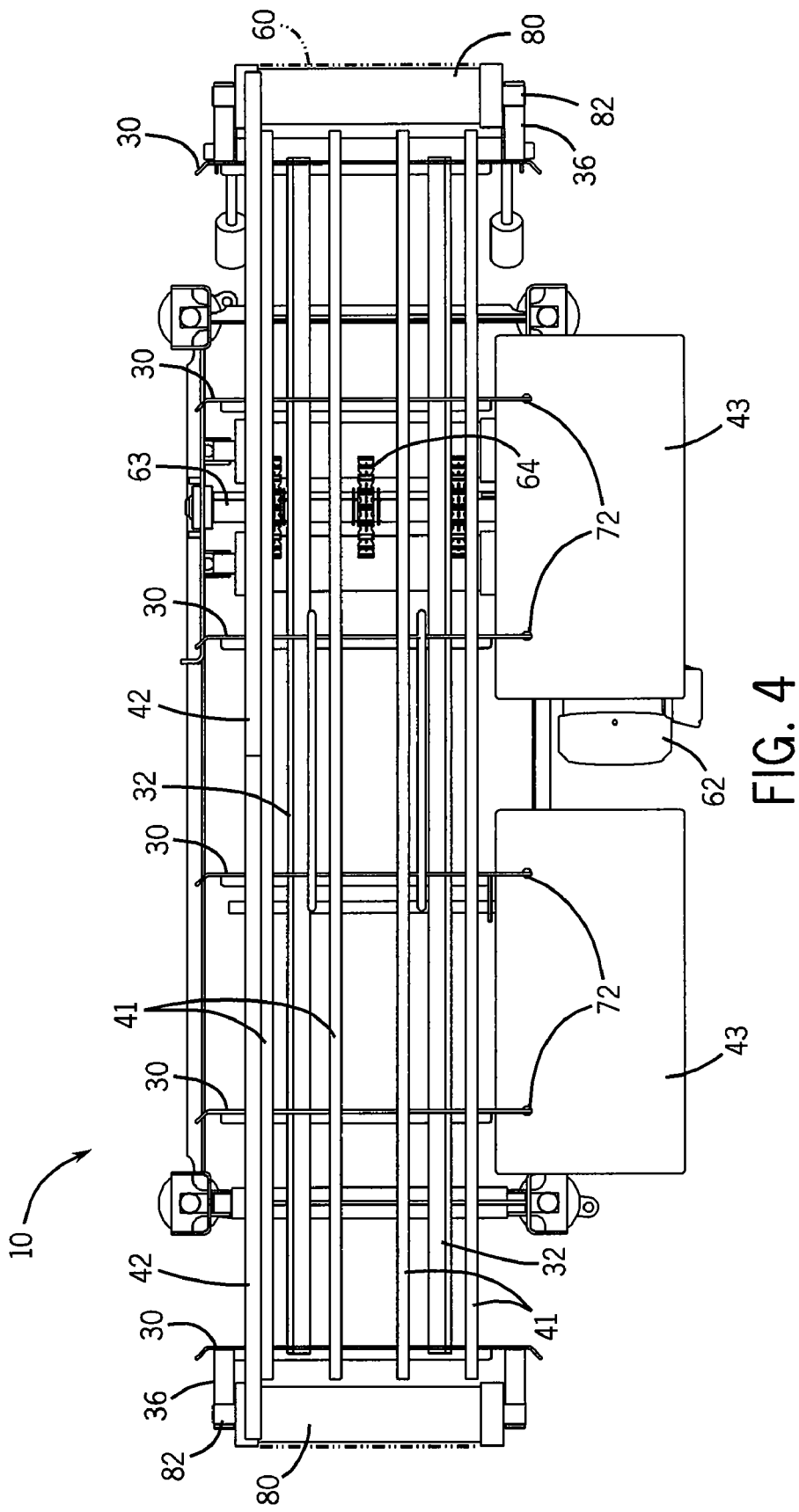
FIG. 4 is a top plan view of the sanitary conveyor of FIG. 1.

In the illustrated embodiment, as shown in FIGS. 1 and 4, for example, the actuator 62 is operably coupled with a drive shaft 63. The drive shaft 63 may be formed of two pieces that are coupled together via an interlocking coupling assembly. This configuration allows for easy assembly and disassembly of the drive shaft 63 and actuator 62. The drive shaft 63 supports drive members 64 that contact the belt 60 and move the belt 60 along sanitary conveyor 10. Thus, the actuator 62 rotates the drive shaft 63 which then rotates the drive members 64 that move the belt 60. In the illustrated embodiment, there are three disc-shaped drive members 64 that are spaced along the length of the shaft 63, although it is understood that any satisfactory number of drive members 64 may be employed. Each drive member 64 is in the form of a gear, and has teeth spaced along an outer edge of the drive member 64 to engage complementary mating drive structure on the belt 60 and move the belt 60 along the sanitary conveyor 10 as the drive members 64 are rotated.

As shown in the bracket assembly of FIG. 3, in the illustrated embodiment of the sanitary conveyor 10, two of the brackets 30 are end brackets 35, i.e., they are located on opposite ends of the frame 20. The end brackets 35 have various slots 50 described above for receiving members 40, e.g., support rails 41 and a side rail 42. Each end bracket 35 also has a pair of roller supports 36 that extend substantially perpendicularly from the end bracket 35. Each roller support 36 is preferably cylindrical in shape, and all of the roller supports 36 are preferably similarly sized.

Each roller support 36 receives and supports a roller 80, which in turn guides the conveyor belt 60 as it moves along the sanitary conveyor 10. The roller 80 may be attached to the roller support 36 using any suitable means. In the illustrated embodiment, each roller support 36 has a saddle-shaped notch 36a that is configured to receive and support a roller axle 82. Thus, each end of the roller axle 82 is supported by a respective roller support 36. The roller 80 is then free to rotate about the axle 82 between the two roller supports 36 as the belt 60 moves along the sanitary conveyor 10. The rollers 80 may be made of any suitable material. Preferably the rollers 80 are made of plastic, and still more preferably of a plastic material such as Delrin®.

Figure 5:
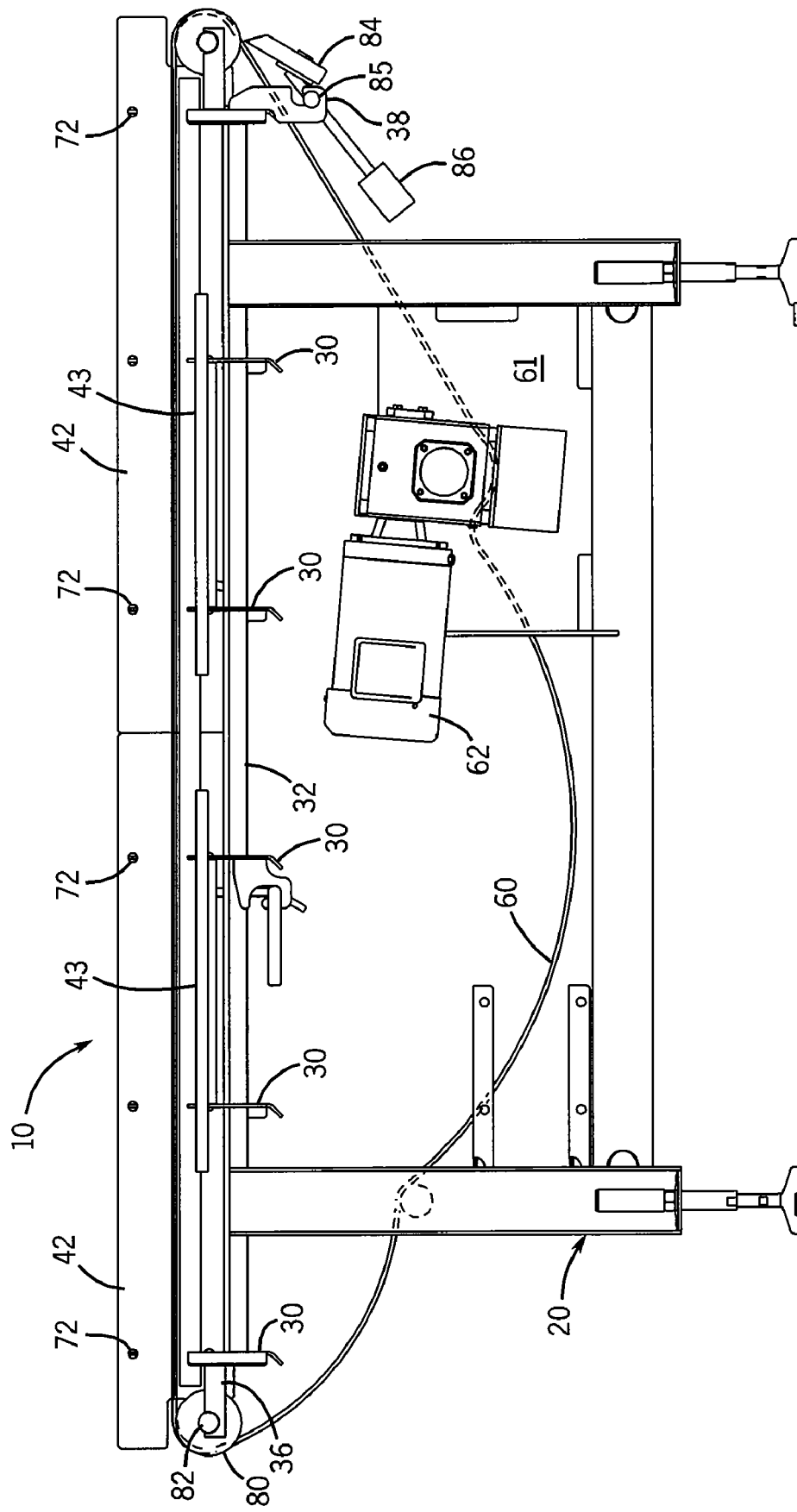
FIG. 5 is a side elevation view of the sanitary conveyor of FIG. 1.

Each end bracket 35 may further include a pair of scraper supports 38 for receiving and supporting a belt scraper 84. As shown in FIG. 5, the belt scraper 84 is pivotably attached to the scraper supports 38, e.g., by means of an axle 85 that is pivotably supported by the scraper supports 36. The scraper 84 includes a biasing element 86, which may be in the form of a counterweight, that biases the scraper 84 toward conveyor belt 60. As the belt 60 moves along the sanitary conveyor 10, the scraper 84 applies pressure to the outer surface of belt 60 against roller 80, and functions to clean the belt 60 of unwanted residue from items carried by the belt 60.

The dimensions of the sanitary conveyor may vary depending on user specifications. In the illustrated representative embodiment, the height of the sanitary conveyor 10 (to the top of the brackets 30) is between about 2½ feet and about 3 feet, and may be about 2¾ feet. The length of the sanitary conveyor 10 (from the ends of the roller supports 36) is between about 6½ feet and about 7½ feet, and may be about 7 feet. The width of the sanitary conveyor (from the legs 22) is preferably between about 1½ feet and about 2½ feet, and may be about 2 feet.

The design of conveyor 10 provides a number of advantages. First, the conveyor 10 can be shipped in a disassembled state and then quickly and easily assembled on-site. Secondly, the conveyor 10 can be easily disassembled for cleaning or maintenance and can thereafter easily be re-assembled. Thirdly, the components of one conveyor can be interchanged with the components of another conveyor, which minimizes the stock of replacement parts that must be maintained by the user. Finally, it is possible to quickly and easily interchange certain of the components, e.g. the tables or side rails, with differently configured components for different applications or operations, as desired.

Various alternatives and modifications are contemplated as being within the scope of the following claims particularly pointing out and distinctly claiming the subject matter regarded as the invention.

I claim:

1. A conveyor comprising:
a frame supporting a conveyor belt;
a bracket attached to the frame;
a member adapted to be supported on the frame by engagement with the bracket;
wherein the bracket includes a slot within which at least a portion of the member is received, the slot having a protrusion that cooperates with an aperture in the member to releasably secure the member to the bracket,
wherein the slot has a first edge and a second edge opposite the first edge which cooperate to define a pocket, and wherein the protrusion is positioned on the second edge, wherein at least a portion of the member is positioned within the pocket and moved away from the first edge and toward and into engagement with the second edge to engage the protrusion within the aperture of the member at a first location on the member; and
engagement structure associated with the bracket and with the member that engage the bracket and the member together at a second location on the member spaced from the first location.

2. The conveyor of claim 1, wherein the first edge has an angled portion which at least in part defines the pocket.

3. The conveyor of claim 2, wherein the member is a side rail and wherein a portion of a surface of the side rail is substantially flush with the second edge of the slot to create a gap between a second surface of the side rail and the angled portion of the first edge of the slot.

4. The conveyor of claim 2, wherein the member is a table and wherein a portion of a surface of the table is substantially flush with the second edge of the slot to create a gap between a second surface of the table and the angled portion of the first edge of the slot.

5. The conveyor of claim 1 wherein the bracket is one of a plurality of similarly-shaped brackets, each bracket being spaced apart from an adjacent one of the plurality of brackets and secured in place by a bracket support member.

6. The conveyor of claim 5, further comprising:
a plurality of support rails, each support rail being secured in respective support rail slots in the brackets;
a side rail secured in respective side rail slots in the brackets, wherein at least one of the side rail slots has a protrusion that is received by a corresponding aperture in the side rail; and
wherein the member is a table.

7. The conveyor of claim 6, wherein the conveyor has four support rails, two tables, and two side rails.

8. The conveyor of claim 1, further comprising:
an actuator for driving the conveyor belt attached to the frame;
two rollers for guiding the belt, each roller being supported by a pair of roller supports that are attached to a respective one of the plurality of brackets that is an end bracket.

9. The conveyor of claim 8, further comprising:
a scraper attached to one of the brackets, wherein the scraper is biased toward the belt by a biasing element.

10. A conveyor comprising:
a frame;
a plurality of brackets attached to the frame, the brackets being spaced apart from one another;
a plurality of support rails removably attached to the plurality of brackets;
a side rail removably attached to the plurality of brackets;
a table removably attached to the plurality of brackets,
wherein the support rails, the side rail and the table are attachable to and removable from the brackets without the need for tools.

11. The conveyor of claim 10, wherein the support rails, the side rail and the table are secured to the brackets by respective slots in the brackets.

12. The conveyor of claim 11, wherein each slot for attaching the side rail has a first edge having an angled portion and a second edge opposite the first edge having a protrusion, and wherein the side rail has a hole for receiving the protrusion.

13. The conveyor of claim 12, wherein each slot for attaching the table has a first edge having an angled portion and a second edge opposite the first edge having a protrusion, and wherein the table has a hole for receiving the protrusion.

14. The conveyor of claim 13, further comprising:
a belt supported by the support rails;
an actuator to drive the belt; and
a scraper attached to an end bracket, the scraper being coupled to a biasing element to bias the scraper toward the belt.

15. The conveyor of claim 14, wherein the biasing element is a weight.

16. The conveyor of claim 11, wherein the support rails are secured within the respective slots via a push-on connection.

17. The conveyor of claim 12, wherein the first edge has a second protrusion that is received by a second hole in the side rail.

18. A method for attaching a member to a conveyor, comprising the steps of:
providing a bracket having a slot;
positioning the member at substantially the same angle as an angled portion of a first edge of the slot;
sliding the member along the angled portion of the first edge of the slot;
pivoting the member about a corner on the first edge;
aligning a hole in the member with a protrusion on a second edge of the slot; and
inserting the protrusion into the hole.

19. The method of claim 18, wherein the member is a side rail.

20. The method of claim 18, wherein the member is a table.

21. A conveyor comprising:
a frame supporting a conveyor belt;
a bracket attached to the frame;
a table;
a slot in the bracket for receiving the table, the slot having a protrusion and the table having an aperture corresponding with the protrusion, wherein the slot, the protrusion and the aperture cooperate to releasably secure the table to the bracket;
wherein the bracket is one of a plurality of similarly-shaped brackets, each bracket being spaced apart from an adjacent one of the plurality of brackets and secured in place by a bracket support member;
a plurality of support rails, each support rail being secured in respective support rail slots in the brackets; and
a side rail secured in respective side rail slots in the brackets, wherein at least one of the side rail slots has a protrusion that is received by a corresponding aperture in the side rail.

22. The conveyor of claim 21, wherein the conveyor has four support rails, two tables, and two side rails.

23. A conveyor comprising:
a frame supporting a conveyor belt;
a bracket attached to the frame;
a slot in the bracket for receiving a member, the slot having a protrusion and the member having an aperture corresponding with the protrusion, wherein the slot, the protrusion and the aperture cooperate to releasably secure the member to the bracket;
an actuator for driving the conveyor belt attached to the frame;
two rollers for guiding the belt, each roller being supported by a pair of roller supports that are attached to a respective one of the plurality of brackets that is an end bracket; and
a scraper attached to one of the brackets, wherein the scraper is biased toward the belt by a biasing element.

* * * * *